United States Patent Office 3,340,258
Patented Sept. 5, 1967

3,340,258
PHENOTHIAZINE DERIVATIVES
Jany Renz, Basel, Jean-Pierre Bourquin, Magden, Robert Fischer, Basel, and Gustav Schwarb, Allschwil, Switzerland, assignors to Sandoz Ltd. (also known as Sandoz A.G.), Basel, Switzerland
No Drawing. Filed Jan. 10, 1966, Ser. No. 519,407
Claims priority, application Switzerland, Jan. 12, 1965, 374/65; Apr. 28, 1965, 5,966/65, 5,967/65
5 Claims. (Cl. 260—243)

The present invention relates to new phenthiazine derivatives and a process for their production.

The present invention provides compounds of general Formula I,

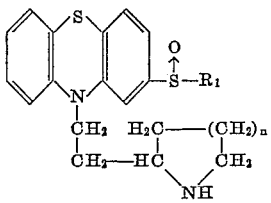

in which $R_1$ signifies an alkyl radical having from 1 to 4 carbon atoms inclusive, and
$n$ signifies 1 or 2, and their acid addition salts.

The present invention further provides the following two processes for the production of the compounds of Formula I:

(1) A compound of general Formula II,

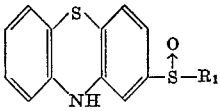

in which $R_1$ has the above significance,
is reacted with a compound of general Formula III,

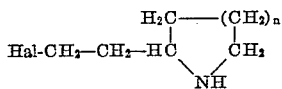

in which

Hal signifies a chlorine or bromine atom, and
$n$ has the above significance, in an inert organic solevnt and in the presence of an alkali.

(2) a compound of general Formula IV,

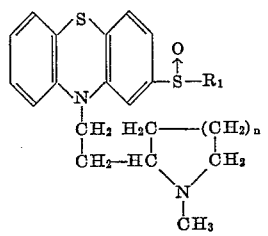

in which $R_1$ and $n$ have the above significance,
is heated with a lower chloroformic acid alkyl ester and the resulting compound of general Formula V,

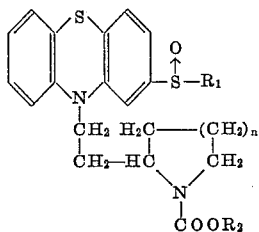

in which $R_1$ and $n$ have the above significance, and
$R_2$ signifies a lower alkyl radical, is subjected to an alkaline hydrolysis at a temperature of from 100–150° C.

The resulting compounds of general Formula I are then optionally converted into their acid addition salts by reacting with an organic or inorganic acid in manner known per se.

Specific methods of effecting each of the above two processes are as follows:

(1) A solution of a compound of general Formula II in an organic solvent therefor which is inert under the reaction conditions, e.g. benzene, toluene or xylene, is heated to the boil for a short time after the addition of an alkali metal amide, e.g. sodium amide, or an alkali metal hydroxide, e.g. sodium hydroxide, and a compound of general Formula III, which has preferably been dissolved in an organic solvent which is inert under the reaction conditions, is subsequently added. After a reaction period of several hours at an elevated temperature the reaction mixture is cooled, washed with water and the resulting compound of Formula I is isolated therefrom in manner known per se and purified, e.g. by crystallization, chromatography and/or salt formation.

(2) A compound of general Formula IV is allowed to react with a low molecular weight chloroformic acid alkyl ester at a temperature of from 30–100° C. in an organic solvent which is inert under the reaction conditions, e.g. acetic acid ethyl ester or benzene, in manner known per se and the resulting carbamic acid ester is heated in an alcohol having a boiling point between 100–150° C. with potassium or sodium hydroxide solution, either as such or after isolation and/or purification. The resulting compound of Formula I may then be isolated and purified as described above and/or converted into a salt thereof by reaction with an inorganic or organic acid.

The compounds of Formula I form crystalline salts with inorganic or organic acids; examples of acids for acid addition salt formation are: hydrochloric, hydrobromic, sulphuric, fumaric, maleic, tartaric, methanesulphonic, benzenesulphonic and naphthalene-1,5-disulphonic acid.

The compounds of general Formula I are antidepressants and exhibit the properties characteristic of antidepressants, e.g. an antagonism towards tetrabenzine, a potentiation of adrenergic effects and of the fever produced by 5-hydroxy-tryptophane and central anticholinergic and anticataleptic effects. As a result thereof and because they exhibit neither a sedative nor a neuroleptic effect, the compounds of general Formula I are indicated for use in the treatment of various psychic disorders, especially conditions of depression, neuroses and psychosomatic illnesses.

A suitable daily dose of compounds I is 50 to 500 mg.
In the following comparative tables the quantitative pharmacological differences in the effects of a compound of the invention, namely 3-methylsulphinyl-10-[2-(piperidyl-2)-ethyl-1]-phenthiazine having the Formula VI,

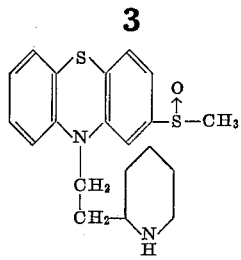

are compared with those of thioridazine (Melleril) of Formula VII,

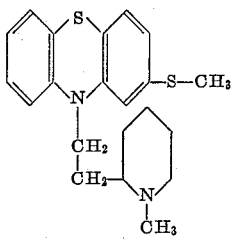

Imipramine (Tofranil) of Formula VIII,

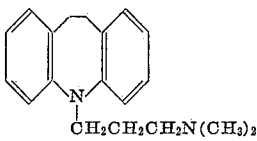

and Amitriptyline of Formula IX.

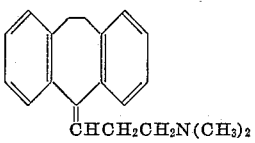

In the following tables the values given are for the free bases.

A. TOXICOLOGY

(1) Acute toxicity

Tests effected with four animal species gave the following values for the $LD_{50}$; compound VI is in the form of the besylate (benzenesulphonate) in these tests.

TABLE 1.—ACUTE TOXICITY

| Compound | $LD_{50}$ mg./kg. | | | | | | | |
|---|---|---|---|---|---|---|---|---|
| | Mice | | Rats | | Rabbits | | Dogs | |
| | Oral | I.v. | Oral | I.v. | Oral | I.v. | Oral | I.v. |
| VI | 670 | 54 | 1,100 | 28 | 850 | 28 | >500 | 40 |
| VII | 350 | 48 | 960 | 49 | 1,090 | 24 | >500 | |
| VIII | 400 | 35 | 625 | 22 | 850 | 18 | | |

An over-all evaluation shows that the compound of Formula VI has the same toxicity as that of the compound of Formula VII on mice, rats, rabbits and dogs. The compound of Formula VI is tolerated slightly better by mice, rats and rabbits than the compound of Formula VIII.

(2) Sub-acute toxicity

(A) RATS

The compound of Formula VI is administered in graduated amounts in the feed to 3 groups of 20 rats each (10 male and 10 female animals) during the course of 4 weeks. For control purposes 20 animals are left untreated. The observations made during the duration of the test are given in Table 2. Rats tolerate 21 mg./kg. daily for 4 weeks without the appearance of any symptoms. In the fourth test week 61 mg./kg. daily produce a slight excitation and a small reduction in weight increase. 232 mg./kg. daily produce clear symptoms of intoxication and death of one animal in the fourth test week. The clinical laboratory tests (blood and urine test) showed no pathological condition in any of the three groups.

(B) DOGS

The compound VI is tested on dogs in the form of gelatin capsules, 3 groups of 4 animals each (2 male and 2 female) being used, with graduated doses during 4 weeks, whereby one group of animals is left untreated for control purposes. The observations made during the duration of the test are given in Table 3.

All dogs tolerate the daily dose of 15 mg./kg. without symptoms. 45 mg./kg. daily first result in a slight dizziness which fades away after 14 days, irregular vomiting and in the case of 2 animals strong diarrhoea. The clinical laboratory tests (blood and urine test) show a normal condition. The highest dose of 135 mg./kg. daily results in clear intoxication symptoms. All animals show dizziness, ataxia and muscular tremor, accompanied by irregular vomiting and—sometimes bloody—diarrhoea.

B. PHARMACODYNAMICS

(1) Sedative-neuroleptic effects

The compound of Formula VI is used in the form of the tartrate in these tests.

(A) MICE

Narcosis potentiation.—20 mg./kg of thiopental administered intravenously have a slight narcotic effect on mice (side position), which on the average lasts 0.7 minute. Potentiation of narcosis is considered to have taken place when sleep is prolonged for more than 2 minutes by pretreatment with the compound tested. The $ED_{50}$ is the dose of the tested compound which potentiates the narcotic effect of 20 mg./kg. of thiopental i.v. in 50% of the animals.

TABLE 2.—SUB-ACUTE TOXICITY (RATS)

| Average daily compound intake | 21 mg./kg. daily | 61 mg./kg. daily | 232 mg./kg. daily |
|---|---|---|---|
| Mortality | 0/20 | 0/20 | 1/20. |
| Symptoms | None | Slight excitation in the fourth week. | Slight excitation and nervousness during the entire duration of the test. |
| Weight increase | Normal | Slight reduction in weight increase | Strong reduction in weight increase and loss of weight. |
| Feed intake | do | Moderate decrease in male animals | Decrease in male animals. |
| Hematology | Negative results | Negative results | Negative results. |
| Clinical chemistry | do | do | Do. |
| Urine analysis | do | do | Do. |

TABLE 3.—SUB-ACUTE TOXICITY (DOGS)

| Average daily compound intake | 15 mg./kg. daily | 45 mg./kg. daily | 135 mg./kg. daily |
|---|---|---|---|
| Mortality | 0/4 | 0/4 | 2/4. |
| Symptoms | None | Slight dizziness, irregularly occurring vomiting, in the case of 2 animals strong diarrhoea. | Dizziness, ataxia and muscular tremor, irregularly occurring vomiting, diarrhoea (in some cases with blood.) |
| Weight increase | Normal | Normal | Weight loss. |
| Feed intake | do | do | Strong decrease in feed intake. |
| Hematology | Negative results | Negative results | Negative results. |
| Clinical chemistry | do | do | One animal with a clearly high SGPT final value and two animals with high phosphatase value. |
| Urine analysis | do | do | Negative results. |

TABLE 4.—NARCOSIS POTENTIATION (MICE)

Compound:                  $ED_{50}$ mg./kg. s.c.
VI ------------------------------------- 53.0
VII ------------------------------------ 3.8
VIII ----------------------------------- 33.5

*Reduction of motility.*—The total motility of mice is determined by the number of light ray interruptions in a cage traversed by 2 rays of light. A sedative effect is manifested on the one hand by an inhibition of spontaneous motility, whereby the mice are placed for 10 minutes in the cage 60 minutes after subcutaneous administration of the compound, and on the other hand by an inhibition of the activity of the mice which has been artificially increased by the subcutaneous administration of 2 mg./kg. of *d*-amphetamine 15 minutes before placing the mice in the cage. The $ED_{50}$ is the dose which reduces the spontaneous and amphetamine motility by 50%.

TABLE 5.—MOTILITY REDUCTION (MICE)

| Compound | $ED_{50}$ mg./kg. s.c. | |
|---|---|---|
| | spontaneous | after amphetamine |
| VI | 22.5 | 22.0 |
| VII | 3.4 | 0.7 |
| VIII | 64.0 | 68.0 |

The sedative effect of the compound of Formula VI on mice is considerably weaker than that of the compound of Formula VII. In comparison with the compound of Formula VIII the compound of Formula VI has a somewhat stronger sedative effect.

(B) RATS

*Inhibition of the conditioned flight reaction.*—Rats are taught to climb on a rod placed in the centre of their cage when they hear the sound of a warning signal emitted to warn them of a painful stimulus in the form of an electric shock about to be administered through the lattice floor of the cage. Trained animals jump on the rod (conditioned flight reaction) as soon as they hear the warning signal (conditioned stimulation), whereas untrained animals do not react to the warning signal, but try to flee (unconditioned reaction) only after receiving the electric shock (uncodnitioned stimulus). By administering doses of neuroleptics which are insufficient to influence the unconditioned reactions, it is possible to determine their sedative effect by measuring the inhibiting effect on the conditioned reactions. This means that a pre-treated, trained animal does not react to the warning signal, although the animal does react at once on feeling the electric stimulus.

The $ED_{50}$ is the dose which inhibits the execution of conditioned reactions by trained animals by 50%.

TABLE 6.—INHIBITION OF CONDITIONED FLIGHT REACTION (RATS)

Compound:                $ED_{50}$ mg./kg. s.c.
VI -------------------------------------- >100
VII ------------------------------------- 21.0
VIII ------------------------------------ 40.0

The compound of Formula VI does not have an influence on the conditioned flight reaction in the dose range used for the test. It therefore has a weaker effect not only than the compound of Formula VII but also than the compound of Formula VIII.

*Inhibition of emotional defecation.*—When trained rats carry out conditioned reactions, they show a characteristic change: they take up a tense attitude and their hair stands on end; especially striking is the increased evacuation, called "emotional defecation." It is thus possible to determine also any special sedative effect exhibited by tricyclic psychopharmaceuticals by the fact that they diminish the number of fecal balls excreted by the rats during a 10 minute period of 10 tests. The $ED_{50}$ is the dose which diminishes the number of excreted fecal balls by 50%.

TABLE 7.—INHIBITION OF EMOTIONAL DEFECATION (RATS)

Compound:                $ED_{50}$ mg./kg. s.s.
VI -------------------------------------- 96
VII ------------------------------------- 6
VIII ------------------------------------ 39

In this test the compound of Formula VI also has a very weak effect and clearly differs from the compounds of Formulae VII and VIII.

*Cataleptic effect.*—A further symptom of a sedative effect exhibited by neuroleptics is catalepsy, a condition in which rats may be placed in any desired abnormal body posture while maintaining the muscle tonus and remaining awake; the abnormal posture is only corrected after a strong sensorial stimulus. In this test the compound of Formula VI proves to be ineffective in doses up to 30 mg./kg. s.c.

(C) MONKEYS

*Observations on wakeful animals.*—Sedative effects may strikingly be observed on wakeful Rhesus monkeys, test animals which are lively and aggressive by nature. The compound tested was administered subcutaneously, intravenously or per os. In the 4 hours following the administration of the compound the behaviour, heart and breathing frequency were observed and compared with the control animals. For a better comparison of the effects of the compounds doses were given in Table 8 with which a slight sedative effect on the animals is just ascertained.

TABLE 8.—OBSERVATIONS ON RHESUS MONKEYS

| Compound | Dose, mg./kg. | Type of administration | Symptoms | | |
|---|---|---|---|---|---|
| | | | Behaviour | Heart frequency variation, percent | Breathing frequency variation, percent |
| VI | 40.0 | S.c. | No sedation | +28 | +3 |
| VII | 2.0 | S.c. | Slight sedation | ±0 | −7 |
| VIII | [1] 20.0 | S.c. | ___do___ | ±0 | ±0 |
| VI | 20.0 | I.v. | No sedation | +5 | ±0 |
| VII | 1.0 | I.v. | Slight sedation | ±0 | −14 |
| VIII | 10.0 | I.v. | ___do___ | ±0 | ±0 |
| VI | 80.0 | P.os. | No sedation | −2 | −32 |
| VII | 10.0 | P.os. | Slight sedation | +31 | ±0 |
| VIII | 100.0 | P.os. | ___do___ | +6 | ±0 |

[1] Appr.

The compound of Formula VI does not have a sedative effect in the dose tested. In this respect the compound of Formula VI has a weaker effect than the compounds of Formulae VII and VIII.

The dampening properties of the compound of Formula VI may summarisingly be evaluated as follows: The compound of Formula VI has no neuroleptic effect and a low sedative effect which is only ascertainable on mice. Neither sedative nor neuroleptic effects are observable in monkeys. No extrapyramidal side effects on human beings are anticipated due to the absence of a cataleptic effect.

(2) Typical effects of antidepressives

While, in what preceded, those effects which are found to be pronounced in neuroleptics (e.g. compound of Formula VII) and which are present to a lower degree in tricyclic antidepressants (compound of Formula VIII), are investigated, in what follows, the effects typical of psychopharmaceuticals known to have an antidepressant effect on human beings are investigated. These are: (1) Inhibiting effect toward the syndromes produced by reserpine or tetrabenazine in small animals, (2) potentiation of the effects of catecholamines and serotonin, and (3) a certain anticholinergic activity.

(A) ANTAGONISM TOWARDS THE INHIBITION OF THE RESERPINE-HYPOTHERMIA PRODUCED BY RESERPINE AND TETRABENAZINE (MICE)

A characteristic effect of reserpine on mice is the lowering of the body temperature. Four hours after the subcutaneous injection of 5 mg./kg. of reserpine, the rectal temperature of the mice has dropped 10° C. In order to determine an inhibiting effect towards this temperature lowering effect the test compound is administered one hour after reserpine. The effective dose (ED) is the amount of test compound which 3 hours later produces a difference in temperature of +2.5° C. in comparison with mice which have only been treated with reserpine.

TABLE 9.—INHIBITION OF RESERPINE-HYPOTHERMIA (MICE)

| Compound: | ED mg./kg. i.p. |
|---|---|
| VI | >20.0 |
| VII | >20.0 |
| VIII | 7.4 |
| IX | 8.0 |

The compound of Formula VI, as opposed to the compounds of Formulae VIII and IX, is ineffective in this test.

Tetrabenazine antagonism (rats).—Tetrabenazine, which has a similar effect mechanism to that of reserpine, produces ptosis and catalepsy in rats. The intensity of these two symptoms is determined by a point system. The inhibiting effect toward tetrabenazine is measured by the $ED_{50}$, i.e. the dose of inhibiting compound (test compound) which lowers the number of points of the control group by 50%.

TABLE 10.—TETRABENAZINE ANTAGONISM (RATS)

| Compound | $ED_{50}$, mg./kg. s.c. | |
|---|---|---|
| | Inhibition of ptosis | Inhibition of catalepsy |
| VI | 1.9 | 1.5 |
| VIII | 1.2 | 2.5 |
| IX | 4.5 | 2.8 |

The compound of Formula VI has a stronger total effect in the tetrabenazine antagonism test than the two antidepressants tested as references. The compound of Formula VI also clearly differs from the compound of Formula VII which inhibits or strenghtens the tetrabenazine syndrome depending on the dose administered.

(B) INFLUENCE ON THE EFFECTS OF NORADRENALIN, ADRENALIN AND SEROTONIN

These tests were effected on the ganglia-blocked (0.4 mg./kg. chlorisondamine i.v.) and narcotized (55 mg./kg. Numal i.v.) dogs and give the dose range at which the blood pressure raising effects of noradrenalin, adrenalin and serotonin are influenced.

TABLE 11.—INFLUENCE ON THE EFFECTS OF NORADRENALIN, ADRENALIN AND SEROTONIN ON THE BLOOD PRESSURE

| Compound | Dose range, mg./kg. i.v. | | |
|---|---|---|---|
| | Noradrenalin | Adrenalin | Serotonin |
| VI | Inhibition 0.05–1.6 | Inhibition 0.05–3.2 | Inhibition 0.05–3.2. |
| VII | Inhibition [1] | Inhibition [1] | Inhibition.[1] |
| VIII | Potentiation 0.2–2.0 | Potentiation [1] | Potentiation 0.2–2.0. |
| IX | Potentiation 0.2–2.0 | Inhibition [1] | Inhibition 0.2–2.0. |

[1] Dose range was not ascertained.

Only the compound of Formula VIII strengthens the effect of the three amines. The compound of Formula IX potentiates the noradrenaline effect, whereas the compounds of Formulae VI and VII inhibit the effect of all the amines. The compound of Formula VI, therefore, clearly differs from the compounds of Formulae VIII and IX in its effect on the effects of noradrenalin and adrenalin on the dogs' blood pressure.

(C) INFLUENCE ON THE 5-HYDROXYTRYPTOPHANE INDUCED FEVER OF RABBITS 5-hydroxytryptophane produces a temperature increase in wakeful rabbits; this temperature increase is assumed to be caused by serotonin (5-hydroxytryptamine) which results in the organism by decarboxylation of 5-hydroxytryptophane. The compounds are examined either by an acute test (administration 30 minutes before 5-hydroxytryptophane) or by sub-acute pretreatment (an injection three, two and one day before 5-hydroxytryptophane).

TABLE 12.—INFLUENCE ON 5-HYDRO_YTRYPTOPHANE FEVER (RABBITS)

| Compound | Acute test | Sub-acute test |
| --- | --- | --- |
| VI | No effect, 0.3–3.0 mg/kg i.v. | Potentiation, 3x1 mg./kg. i.v. |
| VII | Inhibition, 0.1–3.0 mg./kg. i.v. | Inhibition, 3x0.01–3 mg./kg. i.v. |
| VIII | Potentiation, 3 mg./kg. i.v. | |
| IX | Inhibition, 1–3 mg./kg. i.v. | Potentiation, 3x1 mg./kg. i.v. |

The compound of Formula VI potentiates the 5-hydroxytryptophane fever after sub-acute pretreatment in manner similar to the compound of Formula IX. It differs in this respect from the compound of Formula VII which inhibits the fever in the subacute test, and also from the compound of Formula VIII.

(D) ANTICOLINERGIC EFFECTS

Besides the antagonism towards reserpine or tetrabenazine and the strengthening of the effects of biogenic amines there is a third group of properties, namely the anticholinergic effects, which are typical of antidepressives of the type of the compound of Formula VIII. The tricyclic antidepressants have peripheral anticholinergic effects which may be measured on the pupil of mice and also central anticholinergic effects. This central anticholinergic effect is ascertained in that a syndrome of central parasympathicotonic excitation is produced with tremorin or RS-86,[1] which syndrome is then inhibited with tricyclic antidepressants. In the case of tricyclic antidepressants the balance between the central and peripheral anticholinergic activity is considerably shifted towards the central effects, which allows a clear differentiation from the anticholinergics having no antidepressant effect, e.g. atropine.

*Mydriatic effect (mice).*—With the aid of a binocular magnifying glass the diameter of the pupil is measured before and after subcutaneous administration of the compounds. The "$D_{M4}$" is the dose which quadruplicates the diameter of the pupils of mice 60 minutes after administration.

TABLE 13.—MYDRIATIC EFFECT (MICE)

Compound: $D_{M4}$ (60 minutes) mg./kg. s.c.
VI _____ 36.0
VIII _____ 70.0
IX _____ 16.0
Atropine _____ 0.052

*Tremorin antagonism (mice).*—The effects of tremorin are due to cholinomimetic mechanisms. In mice this compound produces symptoms of central excitation (trembling) and peripheral cholinomimetic effects (salivation). The intensity of these symptoms is determined by a point system. The anticholinergic effect is measured by the reduction of the strength of these two symptoms in mice to which the test compound was administered one hour before 20 mg./kg. of tremorin i.v. The $ED_{50}$ is the dose which lowers the number of points of the control group by 50%.

TABLE 14.—TREMORIN ANTAGONISM (MICE)

| Compound | $ED_{50}$, mg./kg. s.c. | |
| --- | --- | --- |
| | Inhibition of tremor | Inhibition of salivation |
| VI | 1.3 | 1.4 |
| VIII | 4.5 | 15.0 |
| IX | 2.1 | 3.0 |
| Atropine | 0.125 | 0.068 |

*RS-86 antagonism (mice).*—In mice RS-86 (2-ethyl-8-methyl-2,8-diazaspiro [4,5]decane-1,3-dione) produces an analgesic effect which is presumably due to central cholinergic mechanisms. This analgesic effect is measured by the prolongation of the time in which mice withdraw their tails from the reach of a painful heat ray. This prolongation of the reaction time produced by RS-86 may be inhibited by anticholinergics having effects on the central nervous system, whereby the $ED_{50}$ is the dose of test compound which reduces the RS-86 effect by 50%.

TABLE 15.—RS-86 ANTAGONISM (MICE)

Compound: $ED_{50}$ mg./kg. s.c.
VI _____ 0.56
VIII _____ 9.8
IX _____ 0.75
Atropine _____ 0.86

An overall evaluation of the anticholinergic effect of the compound of Formula VI on mice shows that this compound has peripheral (mydriasis, salivation inhibition) and central (tremor inhibition, RS-86 antagonism) anticholinergic effects. The relatively more pronounced central anticholinergic effect is measured by comparing the doses that are effective against the tremorin tremor and RS-86 analgesia with the doses that have a mydriatic and salivation inhibiting effect:

TABLE 16.—RELATIVE CENTRAL ANTICHOLINERGIC EFFECT

| Compound | $ED_{50}$ Salivation inhibition/$ED_{50}$ Tremor inhibition | $D_{M4}/ED_{50}$ tremor inhibition | $D_{M4}/ED_{50}$ RS-86 antagonism |
| --- | --- | --- | --- |
| VI | 1.1 | 28.4 | 64 |
| VIII | 3.3 | 15.6 | 7.1 |
| IX | 1.4 | 7.6 | 21 |
| Atropine | 0.54 | 0.42 | 0.06 |

This comparative table shows that the compound of Formula VI has a strong central anticholinergic effect which manifests itself by the fact that, for the compound of Formula VI, the three quotients are greater than 1. This effect is stronger in the compound of Formula VI than in the compounds of Formulae IX and VIII, whereas atropine, which has a relatively low central effect, shows three low quotients.

*Inhibition of perphenazine catalepsy (rats).*—The anticholinergics having a central effect also inhibit the catalepsy produced by neuroleptics or bulbocapnin in rats. This effect is determined quantitatively by testing the antagonism towards perphenazine which has a strong cataleptic effect. A dose of 1 mg./kg. of this compound administered subcutaneously produces a condition in which rats may be placed in abnormal body postures while remaining awake. The extent of catalepsy is determined by a point system. The simultaneous administration of tricyclic antidepressants inhibits the perphenazine catalepsy. The $ED_{50}$ is the dose which reduces the number of cataleptic symptoms of the control group by 50%.

[1] See column 10.

TABLE 17.—INHIBITION OF PERPHENAZINE CATALEPSY

| Compound: | $ED_{50}$ mg./kg. s.c. |
|---|---|
| VI | 0.96 |
| VIII | 6.0 |
| IX | 1.4 |

The compound of formula VI has an anticataleptic effect of rats which surpasses that of the compounds of Formulae VIII and IX. The compound, therefore, also exhibits a characteristic activating effect on rats. A comparison of this effect with the sedative effects of the compound of Formula VI, which have been described as an inhibition of the conditioned flight reaction and of emotional defecation, shows that the activating effect is produced with a lower dose (0.96 mg./kg. s.c.), whereas the damping effect is only weak even with the highest doses.

(3) Other effects

HISTAMINE, ACETYLCHOLINE AND ADRENALIN INHIBITION IN ISOLATED ORGANS

The inhibition of the histamine and acetylcholine effects is tested on the isolated guinea-pig intestine, the inhibition of the effects of adrenalin is tested on the isolated guinea-pig bladder, in Ringer's solution at 37° C. The effective concentrations of test compound are compared with those of thenalidin[2] (also known as Sandosten®), atropine and dihydroergotamine (see Table 18).

TABLE 18.—HISTAMINE, ACETYLCHOLINE AND ADRENALIN INHIBITION IN VITRO

| Compound | Histamine antagonism, $ED_{50}$, g./ml. | Acetylcholine antagonism, $ED_{50}$, g./ml. | Adrenalin antagonism, $ED_{50}$, g./ml. |
|---|---|---|---|
| Thenalidin | $2.5 \times 10^{-9}$ | | |
| Atropine | | $1 \times 10^{-9}$ | |
| Dihydroergotamine | | | $2.3 \times 10^{-9}$ |
| VI | $5.6 \times 10^{-8}$ | $2.1 \times 10^{-8}$ | $7 \times 10^{-9}$ |
| VII | $4 \times 10^{-9}$ | $3.6 \times 10^{-8}$ | $1.3 \times 10^{-9}$ |
| VIII | $3.3 \times 10^{-9}$ | $6 \times 10^{-8}$ | $7.3 \times 10^{-7}$ |

The compounds of general Formula I may be used as pharmaceuticals on their own or in the form of appropriate medicinal preparations for administration, e.g. enternally or parenterally. In order to produce suitable medicinal preparations the compounds are worked up with inorganic or organic adjuvants which are inert and physiologically acceptable.

Examples of such adjuvants are:

for tablets and dragées: lactose, starch, talc and stearic acid;

for injectable solutions: water, alcohols, glycerin and vegetable oils;

for suppositories: natural or hardened oils and waxes.

The preparations may furthermore contain suitable preserving, stabilizing and wetting agents, solubilizers, sweetening and colouring substances and flavourings.

In the examples the salts of naphthalene-1,5-disulphonic acid are named nadisylates and the salts of benzenesulphonic acid, besylates.

In the following non-limitative examples all temperatures are indicated in degrees centigrade. The melting points are corrected.

EXAMPLE 1.—3-METHYLSULPHINYL-10-[2-PIPERIDYL-2)-ETHYL-1]-PHENTHIAZINE

A mixture of 200 g. of 3-methylsulphinyl-phenthiazine (M.P. 193–195°), 35.8 g. of finely pulverized sodium amide and 800 cc. of absolute toluene is boiled at reflux at a bath temperature of 145- whilst stirring. A solution of 136 g. of 2-(piperidyl-2)-1-chloroethane in 350 cc. of absolute toluene is added dropwise during the course of one hour whilst boiling is continued and boiling is subsequently effected for a further 5 hours. After cooling 50 cc. of methanol are slowly added dropwise and the toluene solution is subsequently washed out with 300 cc. of water. Extraction is then effected with 1200 cc. of a 15% aqueous tartaric acid solution. The tartaric acid extract is washed out twice, each time with 250 cc. of benzene, approximately 300 cc. of concentrated sodium hydroxide solution are added until an alkaline reaction to phenolphthalein indicator is obtained and the precipitated oily base is shaken out with 600 cc. of benzene. After washing out the benzene solution with 200 cc. of water, the solution is concentrated in a vacuum. The *benzene sulphonate* is produced in that 119 g. of the crude base and 48 g. of benzenesulphonic acid are dissolved at the boil in 350 cc. of absolute ethanol and cooling is then effected. After crystallizing twice, each time from 100 cc. of absolute ethanol, pure 3-methylsulphinyl-10-[2-(piperidyl-2)-ethyl-1]-phenthiazine besylate, having a M.P. of 142–144°, is obtained. The *naphthalene-1,5-disulphonate* is produced in that 9.26 g. of the base and 7.53 g. of naphthalene-1,5-disulphonic acid are dissolved at the boil in 50 cc. of methanol and cooling is subsequently effected. After recrystallizing twice, each time from 110 cc. of methanol, pure 3-methylsulphinyl-10-[2-(piperidyl-2)-ethyl-1]-phenthiazine nadisylate, having a M.P. of 185–190° (indefinite), sintering above 170° is obtained.

EXAMPLE 2.—3-METHYLSULPHINYL10-[2-(PIPERIDYL-2)-ETHYL-1]-PHENTHIAZINE

A solution of 59.8 g. of chloroformic acid ethyl ester (B.P. 94.5°) in 50 cc. of ethyl acetate is added dropwise at an internal temperature of 50° to a solution of 71.0 g. of 3-methylsplphinyl-10-[2-(1-methyl-piperidyl-2)-ethyl-1]-phenthiazine in 350 cc. of ethyl acetate whilst stirring during the course of 20 minutes and subsequently stirring is continued for a further half hour. After cooling, the reaction mixture is diluted with 300 cc. of benzene and extracted with 180 cc. of a 15% aqueous tartaric acid solution. The organic phase is then washed out with 100 cc. of water, dried over sodium sulphate, filtered and reduced in volume. The 3-methylsulphinyl-10-[2-(1-ethoxycarbonyl - piperidyl - 2) - ethyl - 1] - phenthiazine obtained as evaporation residue is boiled at reflux at a bath temperature of 160° together with 17.7 g. of potassium hydroxide and 165 cc. of 4-methyl-pentanol-(3) for 2½ hours. The reaction mixture is subsequently concentrated in a vacuum, 150 cc. of benzene and 80 cc. of water are added, thorough shaking is effected and the benzene phase separated. After washing out with 50 cc. of water, drying over sodium sulphate, filtration and reduction in volume are effected. The evaporation residue is converted into the *benzene sulphonate* in a manner analogous to that described in Example 1. The resulting, analytically pure 3-methylsulphinyl-10-[2-(piperidyl-2)-ethyl-1]-phenthiazine besylate has a M.P. of 142–144° and is identical with the salt produced in accordance with Example 1.

EXAMPLE 3.—3-ETHYLSULPHINYL-10-[2-(PIPERIDYL-2)ETHYL-1]-PHENTHIAZINE (a) *3-ethylmercapto-10-acetyl-phenthiazine*

100 g. of 3-ethylmercapto-phenthiazine and 164 cc. of acetic anhydride are heated at reflux at a bath temperature of 180° for 8 hours. After evaporating, the residue is recrystallized twice, each time from 350 cc. of ethanol. The resulting pure 3-ethylmercapto-10-acetyl-phenthiazine has a M.P. of 89–91°.

(b) *3-ethylsulphinyl-10-acetyl-phenthiazine*

62.2 cc. of a 30% hydrogen peroxide are added dropwise to a boiling solution of 150.0 g. of 3-ethylmercapto-10-acetyl-phenthiazine in 1500 cc. of ethanol whilst stirring during the course of half an hour and boiling is then continued for 5 hours. After the addition of 1000

---
[2] Thenalidin is 1-methyl-4-N-2-thenylanilinopiperidine.

cc. of water, evaporation is effected in a vacuum until ethanol no longer distils off. The concentrated solution is shaken thoroughly with 1000 cc. of benzene and after washing out with 750 cc. of water the benzene layer is evaporated. The resulting crude 3-ethylsulphinyl-10-acetyl-phenthiazine is further worked up as such.

(c) 3-ethylsulphinyl-phenthiazine

The evaporation residue obtained above is dissolved in 2000 cc. of 90% methanol and after the addition of 103 g. of potassium carbonate is boiled at reflux for two hours. After evaporating the reaction mixture the residue is taken up in 700 cc. of chloroform and washed out with 450 cc. of water. The chloroform layer is subsequently dried over potassium carbonate, filtered and reduced in volume. By crystallizing twice, each time from 500 cc. of ethanol, pure 3-ethylsulphinyl-phenthiazine, having a M.P. of 165–167°, is obtained.

(d) 3-ethylsulphinyl-10-[2-(piperidyl-2)-ethyl-1]-phenthiazine

A mixture of 30 g. of 3-ethylsulphinyl-phenthiazine, 5.1 g. of finely pulverized sodium amide and 120 cc. of absolute toluene is boiled at reflux at a bath temperature of 145° whilst stirring; a solution of 19.3 g. of 2-(piperidyl-2)-1-chloroethane in 20 cc. of absolute toluene is added dropwise during the course of half an hour whilst boiling is continued and boiling is then effected for a further 5 hours. After cooling, 10 cc. of methanol are slowly added dropwise and the toluene solution is subsequently washed out with 75 cc. of water. Extraction is then effected with 250 cc. of a 15% aqueous tartaric acid solution. The tartaric acid extract is washed out twice, each time with 50 cc. of benzene, approximately 65 cc. of a concentrated sodium hydroxide solution are added until an alkaline reaction to phenolphthalein indicator is obtained and the precipitated oily base is shaken out with 150 cc. of benzene. After washing out the benzene solution with 60 cc. of water, the solution is concentrated in a vacuum. 25.3 g. of the crude base obtained as evaporation residue are dissolved at the boil with 9.83 g. of benzene-sulphonic acid in 100 cc. of absolute ethanol and are then cooled well. After recrystallizing the resulting crystalline salt twice, each time from 50 cc. of absolute ethanol, pure 3-ethylsulphinyl-10-([2-(piperidyl-2)-ethyl-1]-phenthiazine besylate, having a M.P. of 160–162°, is obtained.

EXAMPLE 4.—3-ISOPROPYLSULPHINYL-10-[2-(PIPERIDYL-2)-ETHYL-1]-PHENTHIAZINE

(a) 3-isopropylmercapto-10-acetyl-phenthiazine 100 g. of 3-isopropylmercapto-phenthiazine and 168 cc. of acetic anhydride are heated at reflux at a bath temperature of 180° for 8 hours. Evaporation is then effected, the residue is dissolved in 400 cc. of benzene, is washed out with 300 cc. of a 3 N sodium hydroxide solution, then twice, each time with 150 cc. of water, and evaporated. The 3-isopropylmercapto-10-acetyl-phenthiazine obtained as evaporation residue is further worked up as such.

(b) 3-isopropylsulphinyl-10-acetyl-phenthiazine 24.0 cc. of a 35.6% hydrogen peroxide are added dropwise to a boiling solution of 66 g. of 3-isopropylmercapto-10-acetyl-phenthiazine in 600 cc. of ethanol whilst stirring for half an hour and boiling is effected for a further 5 hours. After the addition of 400 cc. of water, reduction in volume is effected until ethanol no longer distills off. 350 cc. of benzene are added to this evaporated solution, thorough shaking is effected, the benzene solution is separated and washed out with 300 cc. of water. The crude 3-isopropylsulphinyl-10-acetyl-phenthiazine obtained after evaporation is saponified as such.

(c) 3-isopropylsulphinyl-phenthiazine

The above crude residue is dissolved in 800 cc. of 90% methanol and is boiled at reflux for two hours after the addition of 41.8 g. of potassium carbonate. After evaporating the reaction mixture the residue is taken up in 400 cc. of chloroform and washed out with 150 cc. of water. After drying the chloroform layer over potassium carbonate, it is filtered and reduced in volume. The evaporation residue is crystallized from 700 cc. of ethanol. The resulting pure 3-isopropylsulphinyl-phenthiazine has a decomposition point of 177–179°.

(d) 3-isopropylsulphinyl-10-[2-(piperidyl-2)-ethyl-1]-phenthiazine

The reaction and working up are effected in a manner analogous to that described in Example 3(d), whereby the following amounts are used: 38.6 g. of 3-isopropylsulphinyl-phenthiazine, 6.24 g. of finely pulverized sodium amide and 200 cc. of absolute toluene. 23.6 g. of 2-(piperidyl-2)-1-chloroethane, dissolved in 25 cc. of toluene, are added dropwise. The crude base obtained as benzene evaporation residue is chromatographed on a column. 41.2 g. of the crude base are dissolved in 200 cc. of benzene and adsorbed on 750 g. of silica gel. The first 1800 cc. of benzene eluate and the following 1200 cc. of benzene+5% methanol eluate are discarded and the following 5000 cc. of benzene+5% methanol eluate are evaporated separately. The tartrate is produced in that 7.55 g. of the evaporation residue are dissolved in 70 cc. of ethyl acetate and are poured ice-cold into a cold solution of 2.83 g. of tartaric acid in 530 cc. of ethyl acetate. After drying over concentrated sulphuric acid in a vacuum exsiccator and then in a drying chamber at 60°, the pure 3-isopropylsulphinyl-10-[2-(piperidyl-2)-ethyl-1]-phenthiazine tartrate, having a M.P. of 120–125°, sintering at 95°, is obtained.

EXAMPLE 5.—3-METHYLSULPHINYL-10-[2-PYROLIDYL-2)-ETHYL-1]-PHENTHIAZINE

(a) 2-(pyrrolidyl-2)-1-chloroethane

A stream of dry hydrogen chloride gas is passed through a solution of 176.0 g. of 2-(2-hydroxyethyl)-pyrrolidine in 360 cc. of chloroform until an acid reaction to Congo red indicator is obtained and then 203.0 g. of thionyl chloride are added dropwise at 10° during the course of 20 minutes. Boiling at reflux is then effected at a bath temperature of 90° whilst stirring for two hours. Evaporation is subsequently effected and the evaporation residue is recrystallized twice, each time from 250 cc. of ethylmethylketone. The analytically pure 2-(pyrrolidyl-2)-1-chloroethane hydrochloride has a M.P. of 69–71°. The base is produced in that the hydrochloride is dissolved in a small amount of water and concentrated sodium hydroxide solution is added thereto. The precipitated oil is extracted with ether, the solution is dried over sodium hydroxide, evaporated and further worked up as much.

(b) 3-methylsulphinyl-10-[2-(pyrrolidyl-2)-ethyl-1]-phenthiazine

A mixture of 34.0 g. of 3-methylsulphinyl-phenthiazine, 6.1 g. of finely pulverized sodium amide and 170 cc. of absolute toluene is boiled at reflux at a bath temperature of 145° whilst stirring. A solution of 20.9 g. of 2-(pyrrolidyl-2)-1-chloroethane in 25 cc. of absolute toluene is added dropwise during the course of half an hour whilst boiling is continued and boiling is then effected for a further 5 hours. After cooling, 10 cc. of methanol are slowly added dropwise and the toluene solution is subsequently washed out with 75 cc. of water. Extraction is then effected with 250 cc. of a 15% aqueous tartaric acid solution. The tartaric acid extract is washed out twice, each time with 50 cc. of benzene, approximately 65 cc. of a concentrated sodium hydroxide solution are added until an alkaline reaction to phenolphthalein indicator is obtained and the precipitated oily base is shaken out with 150 cc. of benzene. After washing out the benzene solution with 60 cc. of water this solution is concentrated in a vacuum. 13 g. of the crude base obtained as evaporation residue are dissolved in 60 cc. of benzene and adsorbed on a column of 260 g. of silica gel. 600 cc. of benzene eluate, 900 cc. of benzene+10% methanol eluate and 900 cc. of benzene/methanol (1:1) eluate are discarded. The following 900 cc. of methanol eluate are concentrated. The tartrate is produced in that an ice-cold solution of 4.2 g. of the base in 40 cc. of ethyl acetate is poured whilst shaking well into a cold solution of 1.76 g. of tartaric acid in 290 cc. of ethyl acetate. The resulting pure 3-methylsulphinyl-10-[2- pyrrolidyl-2)-ethyl-1]-phenthiazine tartrate hydrate is dried in a vacuum exsiccator over concentrated sulphuric acid and then in a vacuum drying chamber at 60°, whereupon it has a M.P. of 80–82° (decomposition), sintering at 65°.

EXAMPLE 6.—PRODUCTION OF TABLETS OF 120 MG. EACH

|  | G. |
|---|---|
| 3 - methylsulphinyl-10-[2-(piperidyl-2)-ethyl-1]-phenthiazine benzenesulphonate | 0.0142 |
| Stearic acid | 0.0010 |
| Polyvinyl-pyrrolidone | 0.0030 |
| Talcum | 0.0030 |
| Maize starch | 0.0100 |
| Lactose | 0.0888 |

The effective compound is mixed with the polyvinyl-pyrrolidone, talcum, maize starch and lactose in dry state. The mixture is subsequently moistened with an alcoholic stearic acid solution and is kneaded until the mass is capable of being granulated. The dried and crushed granulate is pressed into tablets.

What is claimed is:
1. A compound selected from the group consisting of a compound of formula:

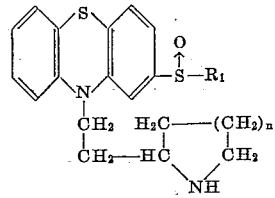

in which $R_1$ is alkyl of 1 to 4 carbon atoms inclusive, and $n$ is 1 or 2,
and a physiologically acceptable acid addition salt thereof.

2. 3 - methylsulphinyl - 10-[2-(piperidyl-2)-ethyl-1]-phenthiazine.

3. 3 - ethylsulphinyl - 10-[2-(piperidyl-2)-ethyl-1]-phenthiazine.

4. 3 - isopropylsulphinyl - 10-[2-(piperidyl-2)-ethyl-1]-phenthiazine.

5. 3 - methylsulphinyl - 10-[2-(pyrrolidyl-2)-ethyl-1]-phenthiazine.

References Cited

UNITED STATES PATENTS

| 2,902,491 | 9/1959 | Stoll et al. | 260—243 |
| 3,084,161 | 4/1963 | Renz et al. | 260—243 |

FOREIGN PATENTS

| 556,725 | 10/1957 | Belgium. |

WALTER A. MODANCE, *Primary Examiner.*

JOHN D. RANDOLPH, *Examiner.*

H. I. MOATZ, *Assistant Examiner.*